United States Patent [19]

Nickel et al.

[11] 3,832,695

[45] Aug. 27, 1974

[54] PARTITIONING CIRCUIT EMPLOYING EXTERNAL INTERRUPT SIGNAL

[75] Inventors: Frank C. Nickel, New Brighton; James R. Swanson, Minneapolis, both of Minn.

[73] Assignee: Sperry Rand Corporation, New York, N.Y.

[22] Filed: Nov. 6, 1972

[21] Appl. No.: 304,172

[52] U.S. Cl. .......... 340/172.5
[51] Int. Cl. .......... G06f 9/18, G06f 13/00
[58] Field of Search .......... 340/172.5

[56] References Cited

UNITED STATES PATENTS

| | | | |
|---|---|---|---|
| 3,174,135 | 3/1965 | Dreyer et al. | 340/172.5 |
| 3,386,082 | 5/1968 | Stafford et al. | 340/172.5 |
| 3,544,973 | 12/1970 | Borck, Jr. et al. | 340/172.5 |
| 3,680,052 | 7/1972 | Arulpragasam | 340/172.5 |

*Primary Examiner*—Gareth D. Shaw
*Assistant Examiner*—John P. Vandenburg
*Attorney, Agent, or Firm*—Thomas J. Nikolai; Kenneth T. Grace; John P. Dority

[57] ABSTRACT

Disclosed is a first switching means for combining and changing partitionable units in a data processing system to form partitioned systems each of which is assigned to a given application such as real time, batch or maintenance, and a second switching means coupled to said first switching means so that each time a partitioning change is made by said first switching means, the second switching means will be switched to generate an EI signal to automatically notify the processor of such change so that the necessary adaptive changes can be made without human intervention.

6 Claims, 5 Drawing Figures

MAI → MULTIPLE ACCESS INTERFACE (TO ACCESS EXTENDED STORAGE SEGMENTS)
MSU → MAIN STORAGE UNIT
MAS → MULTI-ACCESS SUBSYSTEM (TO ACCESS PERIPHERAL DEVICES)
CAU → CONTROL ARITHMETIC UNIT
IOAU → INPUT/OUTPUT ACCESS UNIT

PARTITIONING CIRCUIT EMPLOYING EXTERNAL INTERRUPT SIGNAL

BACKGROUND OF THE INVENTION

This invention relates generally to the partitioning of a data processor system into two or more substantially independent systems for processing different applications, and more particularly to a partitioning means that automatically and immediately notifies the processor of the change in the partitioning arrangement so that the software in the processor can automatically adapt to such partitioning change without the intervention of a human operator.

The concept of partitioning complex data processor systems into two or more substantially independent systems is known. In partitioning arrangements the system is divided into various units such as control arithmetic units (CAU's), input/output access units (IOAU's), main storage units (MSU's), multiple access interface units (MAI's) for accessing extended storage, multiple system access units (MSA's) for accessing peripheral devices and other partitionable units. Under control of the executive program these partitionable units are combined into two or more substantially independent system configurations referred to herein as "partitioned systems." Each partitioned system has at least one CAU, one IOAU, and a separate portion of memory (MSU or MAI). There are at least three main applications to which the independent systems can be assigned. These three applications are real time, batch and maintenance.

All of the CAU's, all of the IOAU's and all of memory units (MSU's and MAI's) can be assigned to the same application if desired so that the entire data processor system is processing only one application. On the other hand, each CAU, each IOAU or each separate memory unit can be assigned to only one application at a given time. However, peripheral devices, which are usually connected to the IOAU units through a multiple access subsystem (MAS), can be assigned to more than one application at a given time.

It is necessary that a record be maintained of the application assignment of each partitionable unit in the processor system so that at any given time any partitioned system will know precisely what units it can utilize in processing the assigned application. Accordingly, means are required to note and record any change of partitioning and to advise the software of the involved partitioned systems of such change so that proper adaptation to such change can be made. Partitioning is usually accomplished by means of toggle switches located on the control panel. By switching appropriate switches the human operator can connect any partitionable unit to a given application.

In prior systems, however, before toggling any partitioning switches, it has been necessary for the operator to advise the software that a partitioning change is about to occur. In order to advise the software of such impending change it has been necessary for the operator to supply appropriate data into the processor by suitable external means such as, for example, a teletypewriter. No partitioning switches can be toggled or switched until such information has been supplied to the processor. Consequently, it has been necessary to provide means for locking the partitioning switches on the control panel so that they cannot be inadvertently switched (toggled). After the processor has been advised of the impending partitioning change then it is necessary to unlock the switches and make the appropriate partitioning changes. The control panel is then again locked until another partitioning change is to be made.

A primary object of the invention is to provide automatic notification to the processor of partitioning changes by means of an external interrupt (EI) signal which is generated simultaneously with the partitioning change.

Another purpose of the invention is the reduction of software overhead needed for partitioning by automatically notifying the software of the partitioning change through an external interrupt signal.

A third aim of the invention is to provide signaling means for automatically notifying the processor of a change in partitioning simultaneously with such partitioning change, thereby avoiding any need for human intervention other than the toggling of the partitioning switches on the control panel.

BRIEF STATEMENT OF THE INVENTION

In accordance with a preferred embodiment of the invention there is provided a plurality of double-pole, double-throw (DPDT) switches or the local equivalent thereof, which are located on the control panel. Each DPDT switch consists of two halves, i.e., two single-pole, double-throw (SPDT) switches. In the invention a first of the two SPDT switches in each DPDT switch is employed for actual partitioning and the second SPDT switch is employed for generating a signal indicating that a change in partitioning has occurred.

The plurality of DPDT switches is divided into a number of groups of switches with the switches of each group being connected to couple an assigned one of the partitionable units into a selectable one of the three applications or to an off-line condition. Thus, for example, each CAU has connected therewith one group of such switches and each IOAU has connected therewith one group of such switches. Similarly, each of the partitionable units (MSU's) of main memory, each unit of extended memory, and each multiple access subsystem has connected therewith a group of such switches. More specifically, each of these groups of switches comprises the first halves (SPDT switches) of three individual DPDT switches for selectively connecting and disconnecting the connected partitionable unit into each of said three applications, and a fourth switch for placing the connected partitionable unit in an off-line condition.

Each of the second halves (SPDT switches) of those DPDT switches associated with each given application are connected together in a series circuit arrangement in such a manner that when any one of said second halves is toggled from either position to the other the series circuit is interrupted momentarily, and an electrical impulse generated thereby. Such electrical impulse is in fact an external interrupt (EI) signal which notifies the IOAU that a change in partitioning for that given application has occured. Such change can either be the addition of a unit to the application or the removal of a unit from the application.

Status words are provided in the system for maintaining up-to-date records of the units assigned to each application. The affected IOAU's, upon receipt of an EI signal, will examine such status words to determine what changes have occurred and will thereupon advise the executive program of such changes so that the necessary changes in software can be made to adapt to the new system configurations.

BRIEF DESCRIPTION OF THE DRAWINGS

The above-mentioned and other objects and features of the invention will be more fully understood from the following detailed description thereof when read in conjunction with drawings in which.

DETAILED DESCRIPTION OF THE INVENTION

Figure 1:
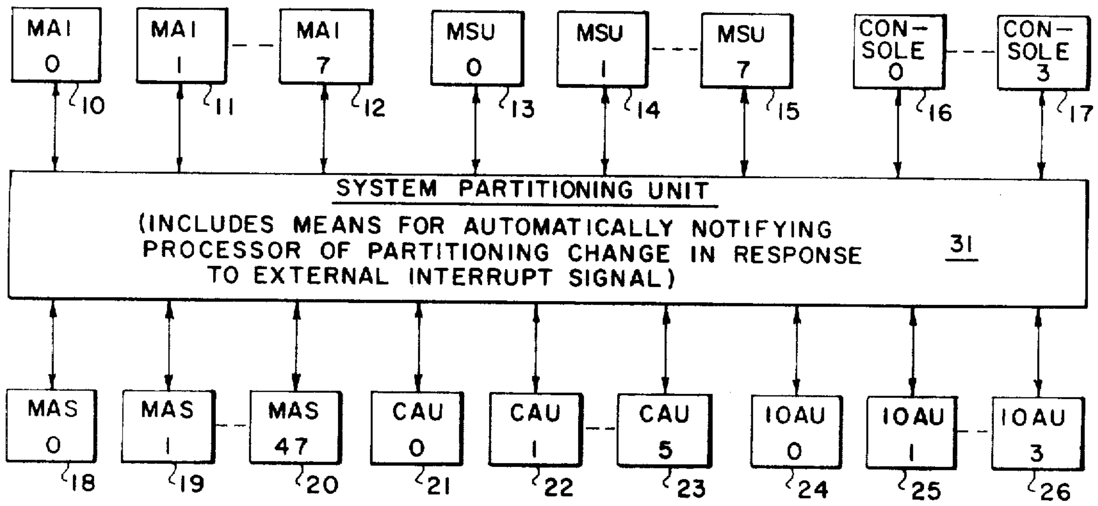
FIG. 1 is a block diagram illustrating the interface between the system partitioning unit (SPU) and the various partitionable units of a data processing system.

Referring now to FIG. 1 there is shown the general arrangement of a system partitioning unit (SPU) and its interface with the various partitionable units of an arbitrarily selected data processing system. Different data processing systems will have different partitionable units. However, for purposes of presentation of the present invention the data processor system has been assumed to have the following units;

a. Eight multiple access interface (MAI) units for accessing extended storage segments. Three of these eight MAI units are represented by blocks 10, 11, and 12 of FIG. 1.

b. Eight Main Storage Units (MSU) for accessing main memory, with these units being represented by blocks 13, 14 and 15 of FIG. 1.

c. Forty eight multi-access subsystems (MAS) for accessing peripheral devices, with a plurality of such devices accessible by each MAS. Three of the MAS systems are represented by blocks 18, 19, and 20.

d. Six control arithmetic units (CAU). Three of the six CAU units are represented by blocks 21, 22 and 23 of FIG. 1.

e. Four input/output access units (IOAU). Three of these IOAU units are represented by blocks 24, 25 and 26 in FIG. 1.

f. Four consoles, two of which are shown in FIG. 1 and represented by blocks 16 and 17.

The system partitioning unit (SPU) is represented by block 31 in FIG. 1 and is capable of combining the various units 10 through 26 into various configurations to perform any one or all of the three applications discussed hereinbefore. As mentioned above, each of the CAU units, the IOAU units, the MAI units and the MSU units can be dedicated to only one application at a given time. All of these units, however, can be dedicated to the same application at the same time. On the other hand, the 48 MAS units in FIG. 1 can be dedicated to more than one application at the same time.

There are two levels of lock-outs in the partitioning system. The first level relates to CAU's, IOAU's, MAI's and MSU's. When one of these units is assigned to a given application it is locked out from all other applications until a partitioning change is made. The second level of lock-out relates to the MAS units. A given MAS can be assigned to more than one application at the same time but the second level of lockout will prevent access of the given MAS by more than one of the assigned applications at a given time and will lock-out the other assigned applications during such time. Upon completion of its transaction with the accessing application, the given MAS unit will then immediately become available to all of the applications to which it is assigned, including the immediately preceding accessing application.

Figure 2:
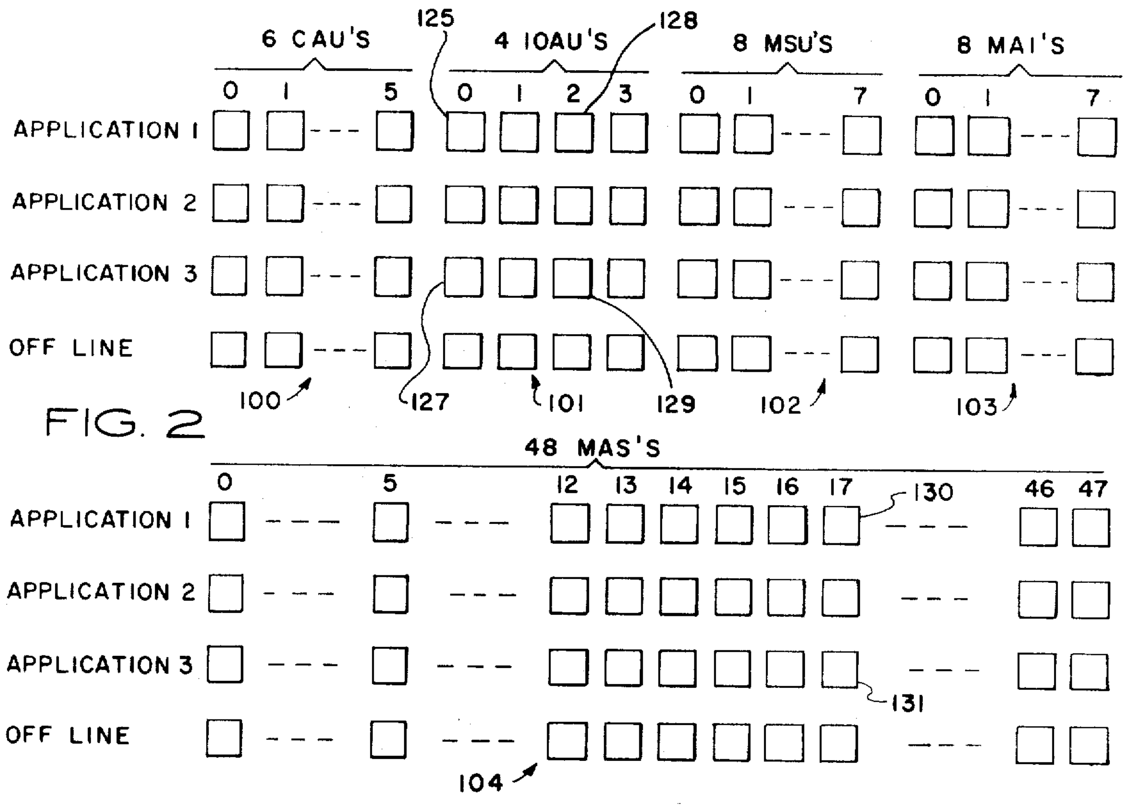
FIG. 2 is an illustration of a typical control panel illustrating the visual display of the status of each partitionable unit of the processor system, including the application to which such unit is assigned, or if the unit is in an off-line condition.

Referring now to FIG. 2 there is shown a representation of a control panel which visually displays the status of each of the partitionable units in the system. More specfically, in FIG. 2 there are shown 5 matrices of small blocks, identified by reference characters 100, 101, 102, 103 and 104. Each of these matrices is dedicated to a different group of partitionable units. For example, matrix 100 displays the status of the 6 CAU's in the system, and matrix 104 displays the status of the 48 MAS's in the system.

As can be seen from FIG. 2 there are four horizontal rows of small blocks in each matrix. The number of vertical columns in each matrix is equal to the number of partitionable units of a particular type. Thus in matrix 100 there are six columns of small blocks, with each column representing a status of each of the 6 CAU's in the system. The left-most column represents CAU 0 and the right-most represents CAU 5. It is to be noted that each small block such as block 125 contains a lamp and certain switching, as will be discussed in FIG. 3.

The top row of matrix 100 indicates which CAU's are assigned to application 1. The second row indicates which CAU's are assigned to application 2 and the third row indicates which CAU's are assigned to application 3. The bottom row of matrix 100 indicates whether the particular CAU is in an off-line condition. Similarly, in matrices 101 through 104, the first, second, third and fourth rows indicate whether the partitionable unit is assigned to application 1, application 2, application 3, or is in an off-line condition.

As will be recalled, the CAU's, the IOAU's, the main storage (MSU), and the extended storage (MAI), represented by matrices 100, 101, 102, 103, respectively, can be assigned to only one application. Accordingly, for each of these units, the indicating light in only one of the four rows will be lighted and will indicate to which application the particular unit is assigned, or if the unit is in an off-line condition.

However, matrix 104 represents the various multi-access subsystems, of which there can be 48. As mentioned above, each of these units can be assigned to one or all of applications 1, 2 or 3. Accordingly, it is possible for a given MAS, such as, for example, MAS 17, to be assigned to applications 1, 2 and 3 simultaneously.

Within each of the small blocks contained in applications 1, 2 and 3 of the matrices 100 through 104 there is located an indicating light which is operable by the double-pole, double-throw switch, also contained therein. Thus, for example, the contents of the individual block 125, which represents the status of IOAU 0 with respect to application 1 is shown in detail within dotted block 150 of FIG. 3. While a detailed discussion of block 150 will be set forth later herein, it should be noted that a double-pole, double-throw switch, the two halves of which are identified by reference characters 160 and 166, and an indicating lamp 172 are contained within block 150.

Figure 3:
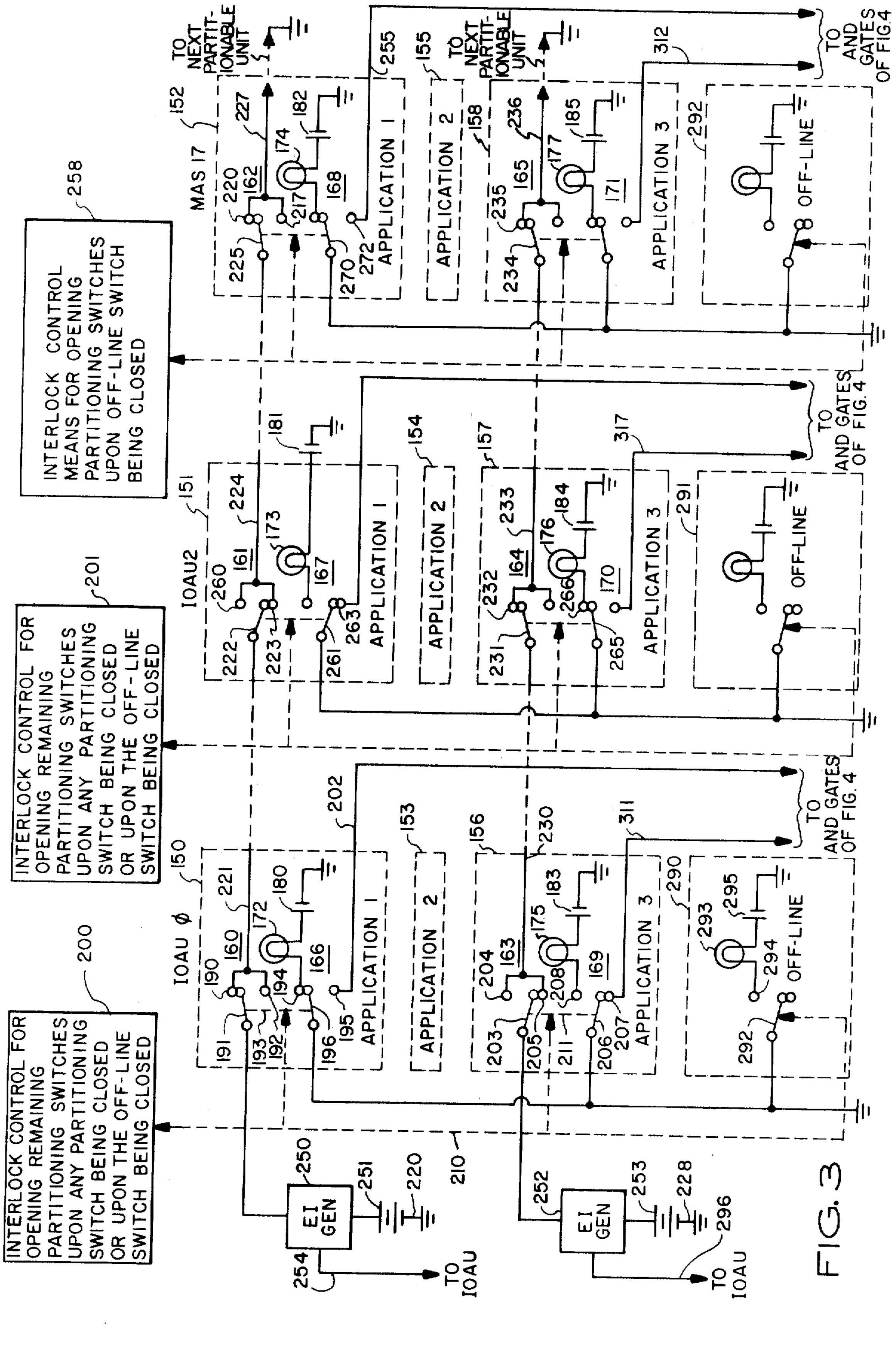
FIG. 3 is a schematic diagram showing the double-pole, double-throw switching arrangement, and the generation thereby of an external interrupt (EI) signal when a partitioning change occurs.

Similarly, the individual blocks 127, 128 and 129 of matrix 101 in FIG. 2 correspond to dotted blocks 156, 151 and 157 of FIG. 3, and the individual blocks 130 and 131 of matrice 104 correspond to dotted blocks 152 and 158 of FIG. 3.

Referring now to FIG. 3 there is shown the switching arrangements for three of the partitionable units to applications 1, 2 and 3. More specifically, blocks 150, 153 and 156 represent the three switches which function to connect IOAU 0 to either application 1, application 2 or application 3, respectively. Similarly, the switches within blocks 151, 154 and 157 function to connect IOAU 2 to application 1, 2 or 3, respectively, and the switches within blocks 152, 155 and 158 connect MAS 17 to applications 1, 2 or 3, respectively. It is to be noted that MAS 17 can be assigned to any or all of applications 1, 2 or 3 simultaneously, whereas IOAU 0 and IOAU 2 can be assigned to only one application at a given time, even though it can be the same application for both IOAU's.

Also, note that while blocks 153, 154 and 155, representing the switches for application 2 for IOAU 0, IOAU 2 and MAS 17, show only an outline of the represented switches, they do in fact have the same internal arrangement as shown in blocks 150, 151 and 152. Each of the DPDT switches 150 - 158 comprises two half DPDT switches, i.e., two SPDT switches, a lamp and a battery source. The half switches are represented by reference characters 160 - 171, the lamps by reference characters 172 - 177 and the batteries by reference characters 180 - 185.

The dotted blocks 290, 291 and 292 represent switches for placing IOAU 0, IOAU 2 and MAS 17, respectively, in an off-line condition. Also each block contains an indicating lamp and a battery. For example, block 290 contains a lamp 293, a battery 295, a switch arm 292 and a contact 294. When the arm 292 makes contact with the contact 294, IOAU 0 is then placed in an off-line condition and control means 200 will ensure, through linkage 210 as will be discussed in more detail later herein, that all of the three switches 150, 153 and 156 are open.

Referring now specifically to the DPDT switch within block 150 the upper half 160 thereof consists of an arm 191, an upper contact 190 and a lower contact 192 and is employed for generating the external interrupt (EI) signal when partitioning change occurs. A more detailed discussion of the generation of such an EI signal will be presented below. At this time it is sufficient to note than when arm 190 changes from contact 190 to 192, or from contact 192 to 190, there is a momentary break in the continuous connection that runs from ground 220 through voltage source 251, EI generator 250 and through half switches 160, 161 and 162 to terminal 227 and thence to ground.

The lower half 166 of the double-pole, double-throw switch in dotted block 150 is comprised of arm 196, an upper contact 194 and a lower contact 195. The two arms 191 and 196 will make contact simultaneously with their upper contacts 190 and 194, respectively, or alternatively will make contact simultaneously with their lower contacts 192 and 195, respectively.

In the closed position shown in FIG. 3, wherein arms 191 and 196 are making contact with their upper contacts 190 and 194, IOAU 0 is connected to application 1. Such assignment to application 1 is indicated by lamp 172 which is connected in a path extending from battery source 180, through lamp 172, contact 194 and arm 196 to ground potential. In the shown setting of switch 150, ground potential is removed from lower contact 195 thereby permitting the potential of lead 202 to assume another enabling potential value by means not shown in FIG. 3 but which, however, operates to place IOAU 0 in application 1 and to thereby connect IOAU 0 to other units also assigned to application 1. For example, lead 202 is connected to one input of AND gate 300 of FIG. 4. The other input 255 to AND gate 300 is enabled when the lower half 168 of switch 152 of FIG. 3 is closed and MAS 17 is thereby assigned to application 1. More specifically the arm 270 of switch 152 is moved to its upper position to light lamp 174 and remove the disabling ground potential from lead 255 which goes to the other input of AND gate 300 of FIG. 4. Thus both inputs of AND gate 300 are enabled and IOAU 0 is connected to MAS (17) 320 of FIG. 4 through AND gate 300, OR gate 312, and cable 317.

The arms 203 and 206 of open DPDT switch 156 in FIG. 3 make with their lower contacts 205 and 207, thereby disconnecting IOAU 0 from application 3. Similarly, IOAU 0 is disconnected from application 2 by a DPDT switch (not shown) within block 153.

The control means 200 is connected to the two mechanical linkages 193 and 211 between the pair of arms 191 and 196 in switch 150 and the pair of arm 203 and 206 in switch 156. Such control means 200 ensures that not more than one of the three switches 150, 153 and 156 is closed (arms 196 and 206 in their upper position) at any given time so that IOAU 0 is never connected to more than one application. More specifically, interlock control means 200 will respond to any of the switches 150, 153 and 156 becoming closed to cause the remaining two switches to become opened, if either was initially closed.

A similar interlock control system 201 is associated with switches 151, 154 and 157 and insures that only one of the switches 151, 154 or 157 is in a closed position at any given time. Thus, IOAU 2 will never be assigned to more than one application at a given time.

Switches 152, 155 and 158 associated with MAS 17, however, do not need such a control means since it is permissible to assign MAS 17 to more than one application at a given time. In fact, it can be seen that switches 152 and 158 of MAS 17 are both in their closed position to thereby assign MAS 17 to both application 1 and application 3. However, control means 258 opens all partitioning switches when off-line switch 292 is closed.

Referring now to switches 151 and 157 of FIG. 3 it can be seen that switch 151 is in its open position, i.e., its two arms 222 and 261 make with their lower contacts 223 and 263. On the other hand switch 157 is in its closed position thereby connecting IOAU 2 to application 3. In closed switch 157 the arms 231 and 265 make with upper contacts 232 and 266 and lamp 176 is lighted.

Thus in switch 150 the lamp 172 is lighted indicating that IOAU 0 is assigned to application 1, and in switch 157 and lamp 176 is lighted indicating that IOAU 2 is assigned to application 3.

When the given partitioning switching arrangement shown in FIG. 3, as will be the case with any partitioning arrangement, there exists a continuous electrical path through each of the upper halves of the DPDT switches in each of the three applications. One of these continuous electrical paths can be traced from ground 220, potential source 251, EI generator 250, arm 191 of the upper half 160 of switch 150, contact 190, lead 221, and 222 of switch 151, contact 223, lead 224, arm 225 of the upper half of switch 162 and contact 220 to output lead 227, and thence to ground.

A second continuous electrical path exists from ground 228, potential source 253, EI generator 252, arm 203 of switch 163, contact 205, lead 230, arm 231 of the upper half 164 of switch 157, contact 232, lead 233, arm 234 of the upper half 165 of switch 158, and contact 235 to the output lead 236 and thence to ground.

If, however, any of the DPDT switches 150, 151 or 152 is toggled from its state as shown in FIG. 3 then a momentary break will occur in the continuous electrical path between points 220 and 227. For example, assume that MAS 17 is removed from application 1. Such removal of MAS 17 from application 1 will require the toggling of switch 152 from its shown closed position to its open position whereby the arms 225 and 270 will make with the lower contacts 217 and 272.

The momentary break thereby created in the continuous circuit between points 220 and 227 will cause EI generator 250 to generate an EI signal and supply such EI signal to IOAU 0 through output 254. Such EI signal is supplied to IOAU 0 since IOAU 0 is assigned to application 1 and the EI signal occurred in application 1.

IOAU 0 will respond to such EI signal to examine certain application status words stored in the SPU 31 of FIG. 1 to determine the nature of the partitioning change. By control means, not shown in FIG. 3, the removal of MAS 17 from application 1 is recorded in such partitioning status words.

After arm 225 has made with lower contact 217 of switch 152 the circuit between points 220 and 227 once again becomes continuous and will remain so until another partitioning change occurs in application 1.

Consider now the case where an IOAU is removed from an application. Assume that IOAU 0 is removed from application 1 and placed in application 3 so that both IOAU 0 and IOAU 2 are assigned to application 3. To perform this change in partitioning the switch 156 is toggled from its shown open condition to its closed condition so that arms 203 and 206 make with their upper contacts 204 and 208.

The interlock control means 200 will then respond to the casing of switch 156 to cause switch 150 to become open and the arms 191 and 196 thereof to break with their upper contacts 190 and 194 and to make with their lower contacts 192 and 195.

Thus both the continuous circuit between points 220 and 227 in application 1 and the continuous circuit between points 228 and 236 in application 3 have been momentarily broken, thereby generating EI signals both in EI generator 250 associated with application 1, and in EI generator 252 associated with application 3.

Such EI signals are then supplied to appropriate IOAU's. The EI signal from generator 252 is supplied both to IOAU 0 and to IOAU 2 via lead 296 advising such IOAU's of the partitioning change.

The EI signal generated by generator 250 will be supplied to any IOAU unit remaining in application 1. Assuming that application is still active it is to be assumed one IOAU unit is still assigned to application 1, even though not shown in FIG. 3, since each application requires at least one IOAU. It is also to be assumed that all active applications have at least one CAU assigned thereto, and at least one section of memory. In addition to the EI signal an interrupt status request will also be sent to the IOAU's. The interrupt status request indicates that the IOAU software should request certain partitioning status words stored in the SPU. The IOAU's will consult said partitioning status words in order to determine the exact nature of the partitioning changes that have occurred. Software in the affected partitioned systems will then make necessary changes in order to adjust to the new partition status. The partitioning status words respond to each EI signal to record the partitioning changes indicated thereby and to maintain an up-to-date record of the partitionable units assigned to each of the three applications.

Figure 4:
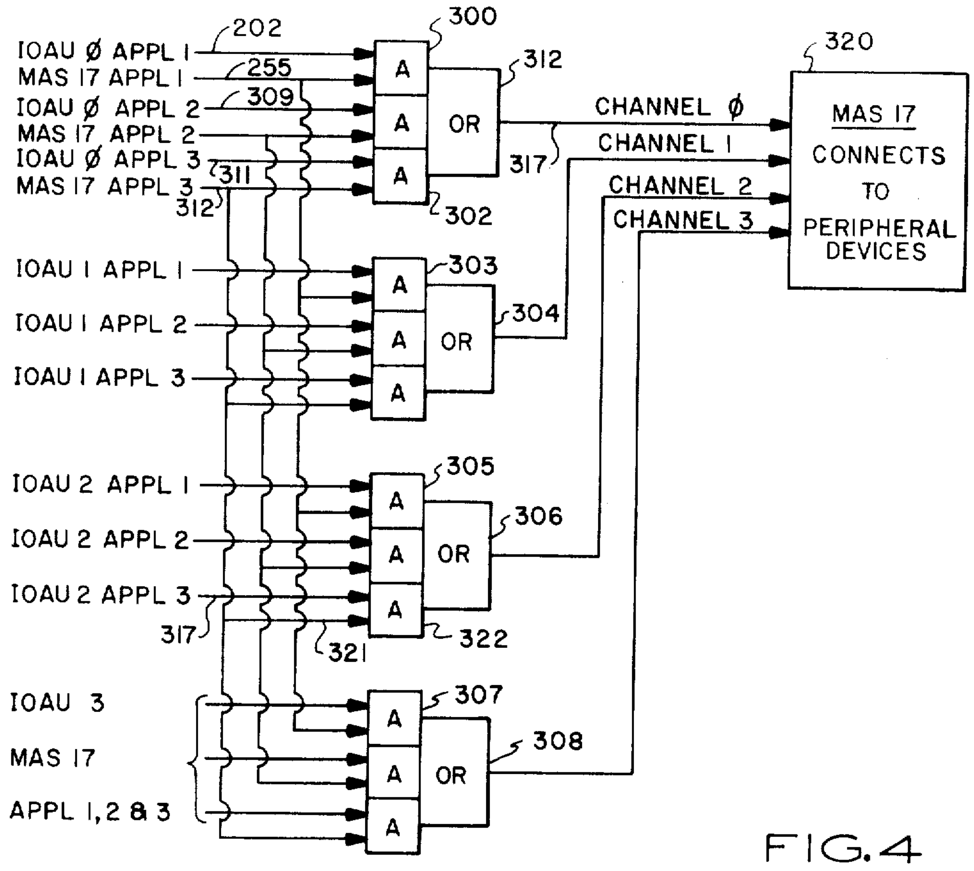
FIG. 4 is a diagram of the logic illustrating how various partitionable units of the processor system are assigned to a given application and further showing how a multiple access system can be assigned to more than one application.

Referring now specifically to FIG. 4 there is shown the general block diagram of the logic for assigning the MAS's to any application. As discussed above IOAU 0 and MAS 17 can both supply enabling pulses to inputs 202 and 255 of AND gate 300 to enable AND gate 300 and thereby permit the accessing of MAS 17 by IOAU 0 in application 1.

Similarly, if IOAU 0 had been assigned to application 3 then IOAU 0 could have obtained access to MAS 17 by means of enabling input leads 311 and 312 to AND gate 302. More specifically, it would be necessary for the switches 156 and 158 of FIG. 3, representing application 3, to be in their closed position to produce enabling signals on output leads 311 and 312 which are connected to the inputs of AND gate 302.

As a further example, MAS (17) 320 of FIG. 4 could be assigned to application 3 to which IOAU 2 of FIG. 3 is also assigned. To provide for such assignments switches 157 and 158 of FIG. 3, representing IOAU 2 and MAS 17 respectively in application 3, should be closed, thereby providing enabling signals to the two inputs 317 and 321 of AND gate 322, the output of which is supplied through OR gate 306 to channel 3 of MAS (17) 320.

The group of three AND gates 303 and OR gate 304 functions to connect MAS 17 to IOAU 1 in application 1, 2 or 3. The three AND gates 307 and OR gate 308 function to connect MAS 17 to IOAU 3 in application 1, 2 or 3. It is to be noted that MAS 17 can be connected to different IOAU's in all three applications or alternatively can be connected to two or more different IOAU's in the same application.

Figure 5:
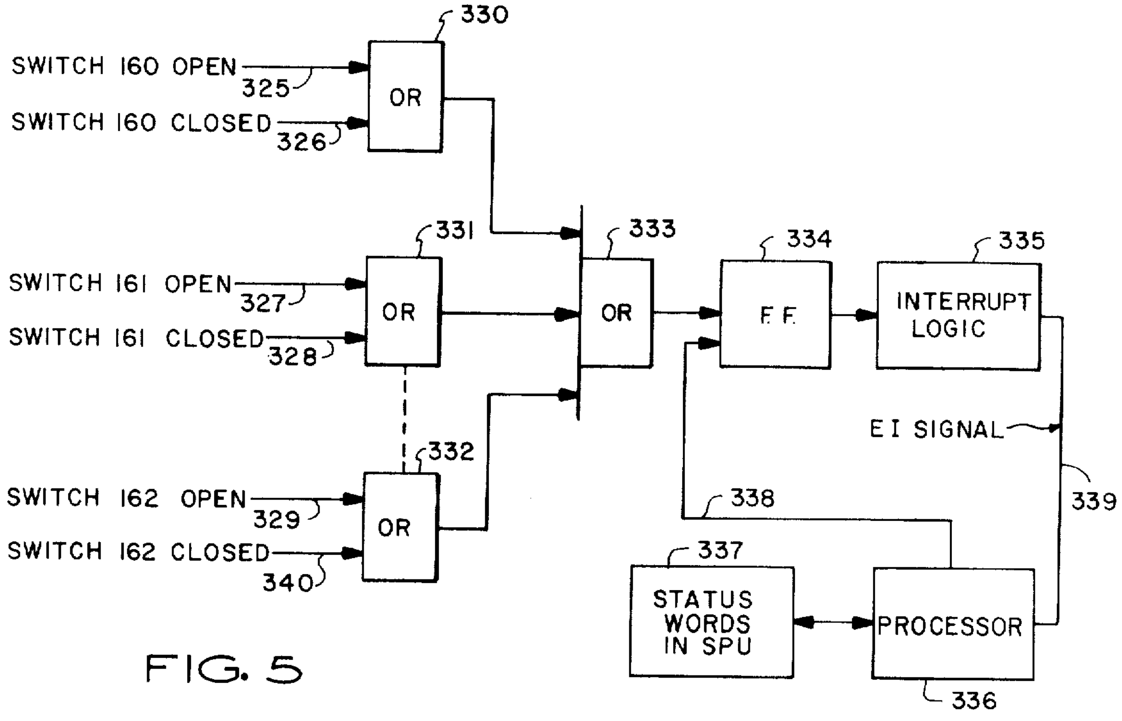
FIG. 5 is a diagram of a logical equivalent of the switching arrangement of FIG. 3.

Referring now to FIG. 5 there is shown a logical equivalent of the daisy chained series arrangement for generating an EI signal. More specifically, there is shown the logical equivalent of the half switches 160, 161 and 162 in FIG. 3. The leads 325 and 326 supply disabling signals to NOR gate 330 when switch 160 is either in an open condition or closed condition, respectively. (It is only when switch 160 is changed from an open condition to a closed condition or from a closed condition to an open condition that a momentary break occurs therein and the momentary enabling signal at the output NOR gate 330 momentarily enables OR gate 333.) Thus there will be momentary output from NOR gate 330 when switch 160 is opened or closed.

Similarly, the leads 327 and 328 supply disabling signals to NOR gate 331 when switch 161 is either in an open condition or a closed condition. It is only when switch 161 is toggled that the output from NOR gate 331 is interrupted to thereby momentarily enable NOR gate 333.

Similarly, the output of NOR gate 332 will supply a disabling signal to OR gate 333 as long as switch 162 remains either in an open or a closed condition. When switch 162 is toggled, then such disabling signal is interrupted and OR gate 333 is momentarily enabled. Thus, when any of the switches 160, 161 or 162 is toggled, then OR gate 333 is momentarily enabled and will produce an impulse to FF 334. The output of the FF 334 is supplied to interrupt logic 335 which, in the particular portion of the system logic shown, is dedicated to application 1. The output of interrupt logic 335, the EI signal, is supplied to processor 336 via cable 339. The EI signal advises the processor 336 of the fact that a change in partitioning has occurred. Processor 336 sends back an acknowledge on cable 338 clearing out the external interrupt logic 334. Then processor 336 sends out a request status function code to the SPU 337. The SPU 337 responds with the first status word and processor 336 upon receiving this information responds with an acknowledge. This acknowledge sets up the second status word and waits for the processor 336 acknowledge. Upon receiving this acknowledge, the SPU 337 sets up the third status word until an acknowledge is received. The final acknowledge clears out the status word register and the transfer is complete.

What is claimed is:

1. In a data processing system having a plurality of partitionable units and a plurality of first switching means for combining said partitionable units into at least one partitioned system, means for automatically notifying the data processing system of a partitioning change and comprising:

a plurality of second switches individually coupled, one each, to individual ones of said first switching means and with one each assigned to each partitionable unit for each application to which said partitionable unit can be assigned by said first switching means;

all of said second switches assigned to each application being connected together in a series circuit arrangement;

a control means responsive to a change by a first switching means in the partitionable units assigned to a given application, to cause the second switch assigned to the changed partitionable unit in said given application to generate a signal in the series circuit arrangement in which it is connected; and logic means responsive to said generated signal to adapt said data processing system to said change in partitioning.

2. Apparatus as in claim 1 and further including:

interlock control means responsive to the switching of a given one of predetermined partitionable units into a given application to automatically disconnect said given predetermined partitionable unit from any other application in which it had previously been assigned by switching said first switching means, and to switch the particular second switch coupled to said particular first switch assigned to the given predetermined partitionable unit in said other application.

3. In a data processing system having a plurality of partitionable units and a plurality of first switching means for combining said partitionable units into at least one partitioned system; means for automatically notifying the data processing system of a partitioning change and comprising:

a plurality of second switches arranged in a matrix with each column of switches being assigned to a given unit to connect said unit into a given one of a plurality of applications and with each row of switches being individually assigned to connect individual ones of said units to a given application;

the second switches in each row being connected in a series arrangement to form a single continuous electrical path; and coupling means responsive to the switching of a given one of said units into or from a given application by said first switching means to switch the particular second switch assigned to said given unit and said given application to interrupt said continuous electrical path and thereby generate an external interrupt signal.

4. In a data processing system of the type including at least one central processor and a plurality of partitionable units including multi-access sub-systems for accessing peripheral devices, said partitionable units being partitionable into operable sub-systems, each assigned to one of a plurality of applications, the improvement comprising:

a. a system partitioning unit including for each partitionable unit;
   1. first switch means associated with each of said plurality of applications, and
   2. second switch means for placing said partitionable unit off-line;
b. gating means coupled to said first and second switch means of each of said partitionable units for producing a signal indicating which of the partitionable units is assigned to a given application;
c. means for generating an external interrupt signal upon the operation of any one of said first or second switch means associated with any one of said partitionable units;
d. switch interlock means connected to each of said first and second switch means associated with a multi-access sub-system for opening said second switch means upon the closing of any one of said first switch means and for opening all of said first switch means upon the closing of said second switch means; and e. further switch interlock means associated with each of the other of said partitionable units for resetting all of the other of said first and second switch means upon the setting of any of said first or said second switch means.

5. The data processing system as in claim 4 wherein each of said first and second switch means comprise double-pole switches, one pole of each switch providing a partitioning signal to said gating means, the other pole of each switch being connected to produce an external interrupt signal upon the operation of any of said first or second switch means.

6. The data processing system as in claim 5 wherein said system partitioning unit further includes a status word register for storing status words indicating the partitionable units assigned to each application, the contents of said status word register being accessible to said central processor; and means including said means for generating said external interrupt signal for indicating to said processor that the contents of said status word register has been altered.

* * * * *